United States Patent [19]
Savoca

[11] Patent Number: 6,150,660
[45] Date of Patent: Nov. 21, 2000

[54] STARING HORIZON SENSOR

[76] Inventor: Robert C. Savoca, 133 Old West Mountain Rd., Ridgefield, Conn. 06877

[21] Appl. No.: 09/181,115

[22] Filed: Oct. 28, 1998

[51] Int. Cl.⁷ .................................................. G01J 5/14
[52] U.S. Cl. ......................... 250/342; 250/349; 250/340
[58] Field of Search .................................. 250/340, 342, 250/349, 338.3

[56] References Cited

U.S. PATENT DOCUMENTS

| | | | |
|---|---|---|---|
| 3,936,629 | 2/1976 | Desvignes | 250/206.2 |
| 4,785,169 | 11/1988 | Gontin | 250/340 |
| 4,794,245 | 12/1988 | Auer | 250/206.2 |
| 5,055,689 | 10/1991 | Proffit et al. | 250/349 |
| 5,079,419 | 1/1992 | Falbel | 250/338.1 |
| 5,399,862 | 3/1995 | Savoca | 250/349 |
| 5,477,052 | 12/1995 | Doctor | 250/349 |
| 5,585,633 | 12/1996 | Tulet | 250/338.3 |
| 5,646,723 | 7/1997 | Fallon | 356/139.01 |
| 5,721,431 | 2/1998 | Hersom et al. | 250/342 |
| 5,744,801 | 4/1998 | Diedrickson | 250/349 |
| 5,903,007 | 5/1999 | Savoca | 250/342 |

*Primary Examiner*—Constantine Hannaher
*Assistant Examiner*—Albert Gagliardi
*Attorney, Agent, or Firm*—Joseph Levinson; Mark P. Stone

[57] ABSTRACT

A staring horizon sensor is mounted on an orbiting satellite has one or more linear infrared detector arrays having the horizon being detected imaged thereon. The arrays are each connected in cyclic repetitive alternating polarity patterns for generating at least two output signals which are offset in phase. The output signals are processed to locate the position of the horizon on the arrays. The repetitive pattern interconnection of the elements in the arrays provide a focal plane data compression which reduces the bandwidth as well as the complexity of the processing electronics. In addition, interconnecting the detective elements in repetitive alternating polarity groups having a spatial frequency greater than the spatial frequency of the thermal variation of the horizon minimize any error due to the earth's thermal variations.

9 Claims, 6 Drawing Sheets

OUTPUT SIGNAL VS HORIZON LOCATION

STARING HORIZON SENSOR

BACKGROUND OF THE INVENTION

This invention relates to a staring or static type horizon sensor using linear arrays of infrared detectors having the horizon to be detected imaged thereon in which the elements of the array are interconnected in groups of repetitive patterns of alternating polarity whose outputs are processed to provide attitude information.

The two main categories of horizon sensors are scanning and staring or static types. The scanning sensor mechanically scans the image of the earth over an infrared detector whose signal output is used to determine the attitude of the horizon sensor with respect to the earth. These sensors provide good accuracy over a wide angular range but have limited reliability due to moving parts.

In the staring or static type horizon sensor, the horizon is imaged onto an infrared detector so that the edge of the earth's image falls in the infrared detector's active area which senses the thermal discontinuity between the relatively warm earth and cold space and uses this information to determine the attitude of the spacecraft on which the sensor is positioned. Since the earth's radiance is non-uniform and unpredictable even in the most favorable optical band due to latitude, season and the weather, the staring sensor causes errors that increase with the angular extent of the earth subtended by the sensor's field-of-view. By dividing the field-of-view into many small sized elements, a simple linear array of infrared detectors offers extended range and higher accuracy than the staring sensor having larger areas and fewer elements. The disadvantage of the multidetector linear arrays is the requirement of sampling and processing the signal outputs of each element in the array which requires a multiplicity of electronic switches and processing electronics to convert the output signals to usable information.

SUMMARY OF THE INVENTION

Accordingly, it is an object of this invention to provide a new and improved staring linear array horizon sensor which has high accuracy in determining the angle of the earth with respect to a spacecraft and maintains high accuracy over wide angular range of operation.

Another object of this invention is to provide a new and improved staring linear array horizon sensor having a smaller number of signal outputs than the number of detectors in the linear array thereby reducing the electronic bandwidth of the sensor, the electronic complexity and enhancing reliability.

Still another object of this invention is to provide a new and improved staring linear array horizon sensor that minimizes error in the attitude measurement due to the earth thermal variations.

Yet another object of this invention is to provide a new and improved staring array sensor that maintains the range and accuracy of a simpler array using hard wire interconnections of the elements of the array to provide focal-plane-data compression and to reduce the number of output signals from the array.

In carrying out this invention in one illustrative embodiment thereof, a method of determining the attitude of a spacecraft using a staring array horizon sensor comprises the steps of imaging the horizon on linear array infrared detector means, interconnecting the elements of the linear array infrared detector means in repetitive cycles of alternating polarity patterns, offsetting the phase of said repetitive cyclic alternating polarity patterns of infrared detectors, deriving signal outputs from said patterns of infrared detectors and, quadrature detecting said signal outputs to determine the position of the spacecraft with respect to the horizon.

BRIEF DESCRIPTION OF THE DRAWINGS

The invention together with further objects, advantages, aspects and features thereof will be more clearly understood from the following description taken in connection with the accompanying drawings.

DESCRIPTION OF THE PREFERRED EMBODIMENT

Figure 1:
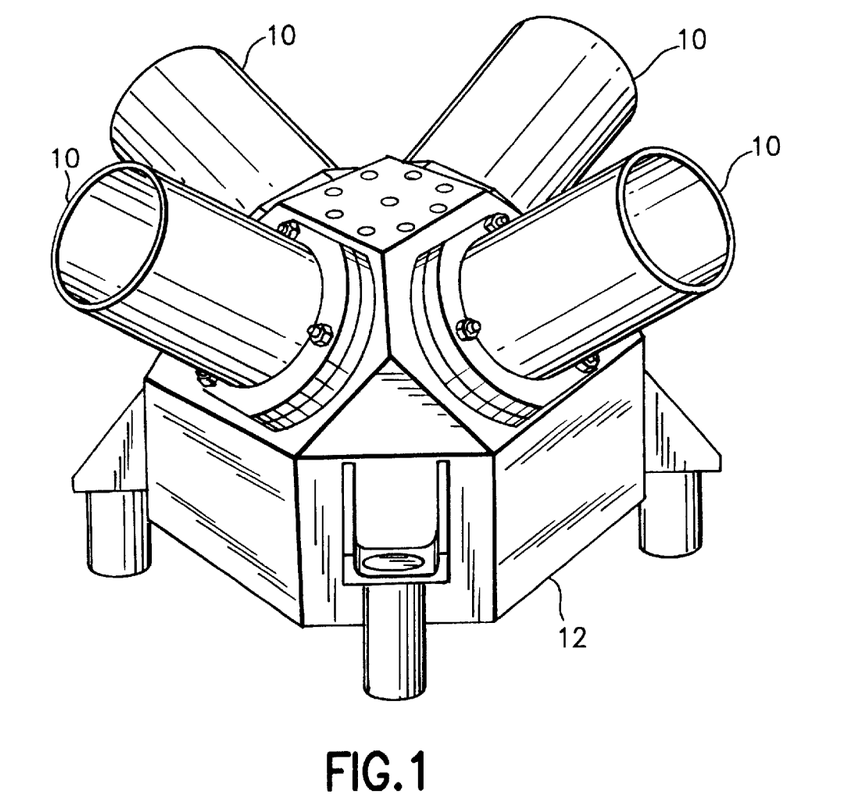
FIG. 1 is a side elevational view of an illustrative embodiment of a horizon sensor utilizing the present invention using four telescopes.

The horizon sensor in accordance with the present invention comprises one or more telescopes each of which contains one or more detector arrays which are mounted in a satellite or spacecraft. FIG. 1 shows an illustrative arrangement using four telescopes mounted in a unitary housing 12 which provides the proper angular orientation of the telescopes 10 and houses the required electronics. While only one telescope is essential for geosynchronous mission or a single axis application at low earth orbit (LEO—approximately 200 km to 5000 km), additional telescopes provide improved accuracy and redundancy in case a telescope is damaged or disabled.

Figure 3:
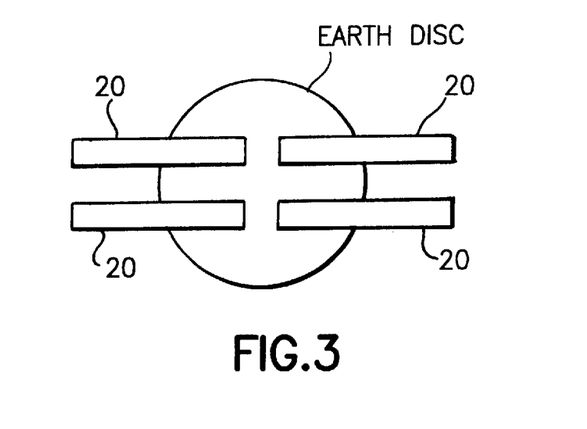
FIG. 3 is an illustrative embodiment projecting the field of view patterns on an earth disc using two of the four telescope sensors shown in FIG. 1 in a geosynchrous application.

FIG. 3 illustrates the use of the two telescopes of FIG. 1 which are mounted on the spacecraft with the optical axis of each telescope pointing toward the edge of the earth's disc. Each telescope 10 contains two linear detector arrays 20. In FIG. 3, the image of detectors 20 having 2 degree×16 degree fields are shown which is a suitable configuration for a geosynchronous altitude sensor. The earth's image is shown covering about half the active area of the detector 20 which is known as the "dip-in", or in this example, an 8 degree "dip-in".

Figure 2A:
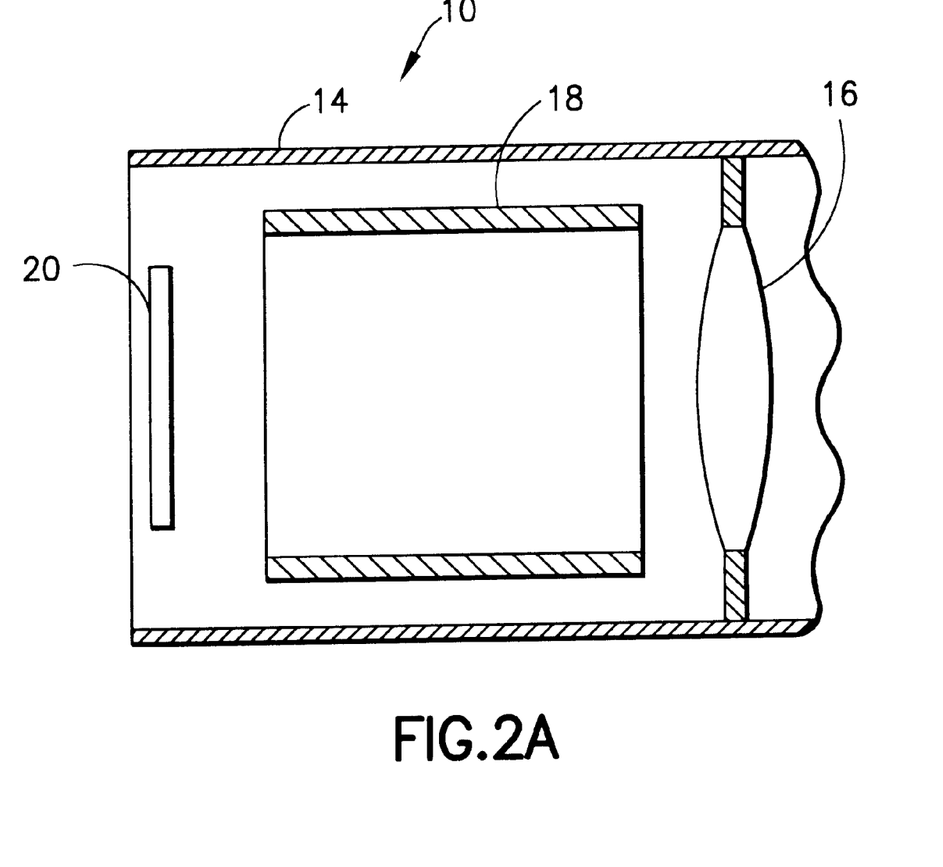
FIG. 2A is a longitudinal cross-sectional view of one type of telescope that may be used in FIG. 1

As will be seen in FIG. 2A each telescope 10 include a housing 14 which has lens 16 positioned on one end thereof and encloses a linear detector array 20 therein. An offset radiation source 18 may also be enclosed by the housing 14.

In a preferred embodiment the infrared detector array 20 is made up of a plurality of detector elements in form of thermopile detectors. The thermocouples provide a wide latitude of geometrical configurations, and accordingly can provide the sensitivity pattern desired particularly since the reference junctions of a thermocouple can be deposited with positive and negative polarity or zero sensitivity. Although other infrared detectors such as thermal, photovoltaic or photoconductive may be used, the thermocouple is preferred because of the flexibility in the design and the multitude of interconnections of individual elements which can be made to form the thermopiles employed in this invention.

Figure 2B:
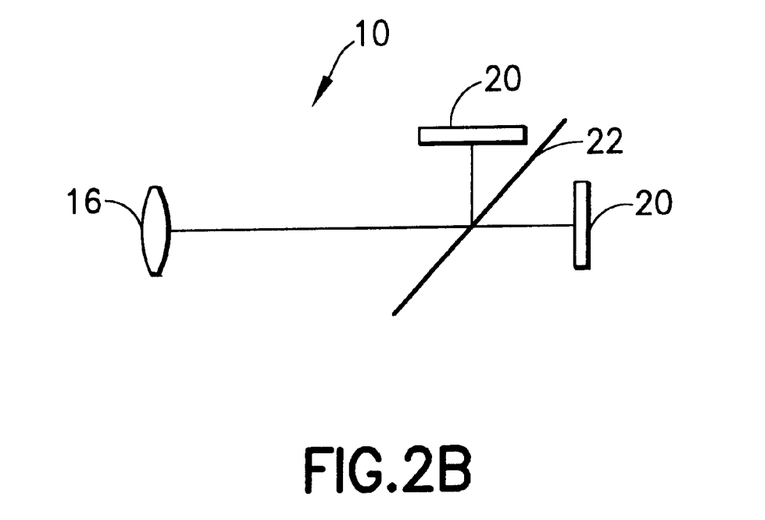
FIG. 2B is a schematic diagram of another type of telescope incorporating a beamsplitter which may be used.

FIG. 2B illustrates a schematic of a telescope 10 using a beam splitter 22. In some applications where more than one linear detector array 20 is employed, it may be desirable for each such linear array 20 to have the same field of view to increase the accuracy.

The staring linear array 20 as pointed out is made up of a plurality of small elements of either thermocouples as preferred or by using pattern masks or lenticular arrays over large type detectors. By using thermocouples and connecting the active junctions of the thermocouple together in cyclic, alternating polarity patterns provides a hard-wired, focal plane data compression which reduces the number of output signals and enhances the reliability of the sensor. By connecting the detector elements together in predetermined cyclic patterns having a spatial frequency greater than the spatial frequency of the thermal variation of the earth in the optical band of interest e.g. the carbon dioxide band, an output signal is generated containing information on the position of the earth's horizon that minimizes any error due to the earth's thermal variation. This amounts to a form of data compression because the useful signal due to the horizon edge is preserved while the effects of the earth's thermal variation are suppressed. Also by using a smaller number of outputs, the electronic bandwidth of the sensor electronics can be reduced.

Another aspect of the invention is that by using a second similar detector group offset from the first, their outputs can be combined to accurately determine the horizon position with respect to the periodic structure of the pair, referred to as quadrature detection of phase, and herein is called a quadrature detector. Since this method only determines the relative position of the horizon within the periodic cycle of the detector, the absolute position is still required to be determined. In one implementation, two, or more, quadrature detectors with different spatial periods are combined to determine the absolute horizon position. In another implementation, a traditional, coarse, staring sensor is used to determine the position to the nearest periodic cycle. The additional detectors could be combined into a single sensor package utilizing a single telescope or could use multiple telescopes or separate packages or some combination of these packaging methods. Another implementation would use some other lower-accuracy attitude-sensing method to determine the horizon crossing to the nearest cycle; e.g. an attitude-mode Global Positioning Sensor (GPS) or a magnetometer might be used. However, the invention is not limited to the use of these sensors.

Naturally, groups of these detectors could be combined, either together in a single unit or separately in several units, and the horizon location determined relative to these detectors at a number of different points around the earth's disk, (e.g. see FIG. 3) and the results combined to determine attitude with respect to the earth.

Figure 4A:
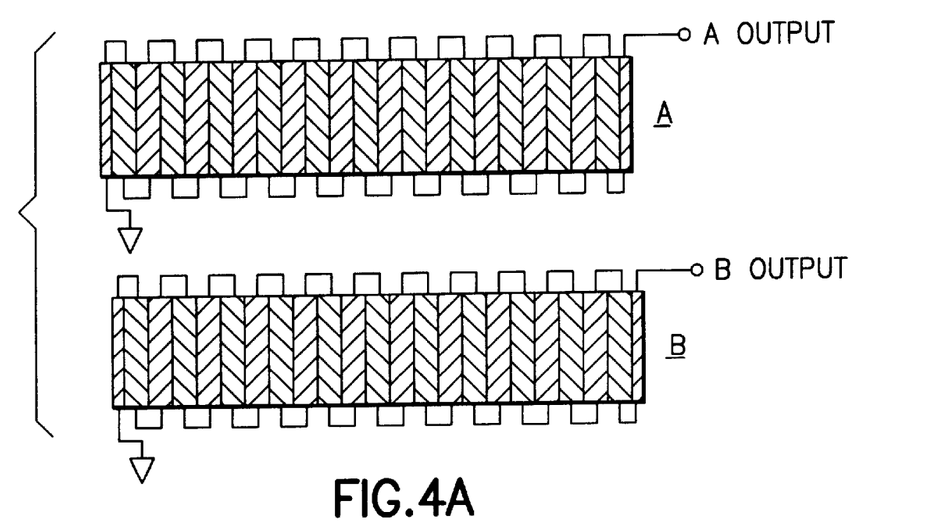
FIG. 4A is an illustrative schematic embodiment of two linear detector arrays in quadrature.
Figure 4B:
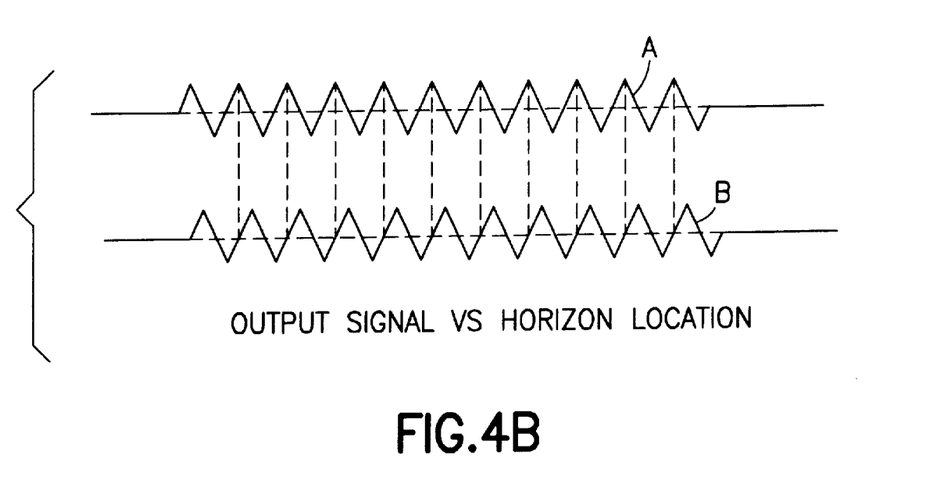
FIG. 4B illustrates the output signals vs. the horizon location for the detectors shown in FIG. 4A.
Figure 5A:
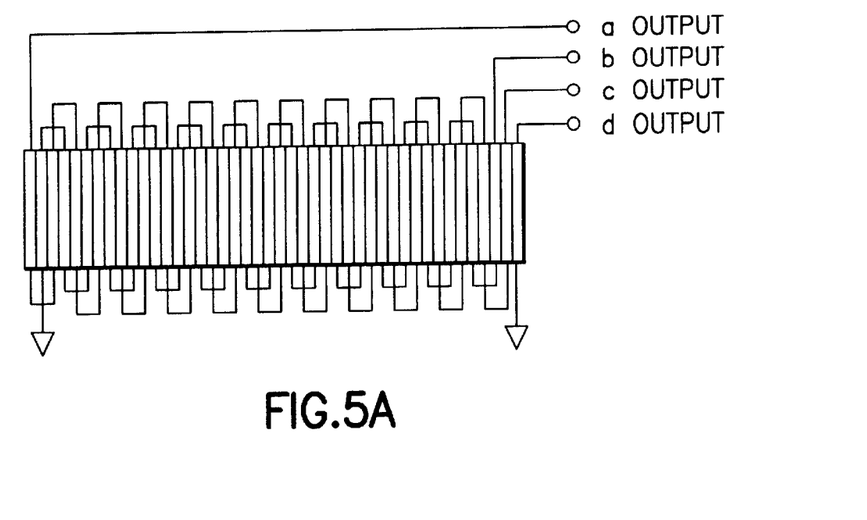
FIG. 5A illustrates the use of a single array in which the output of the detectors in FIG. 4A are synthesized by interconnecting the detectors as shown.
Figure 5B:
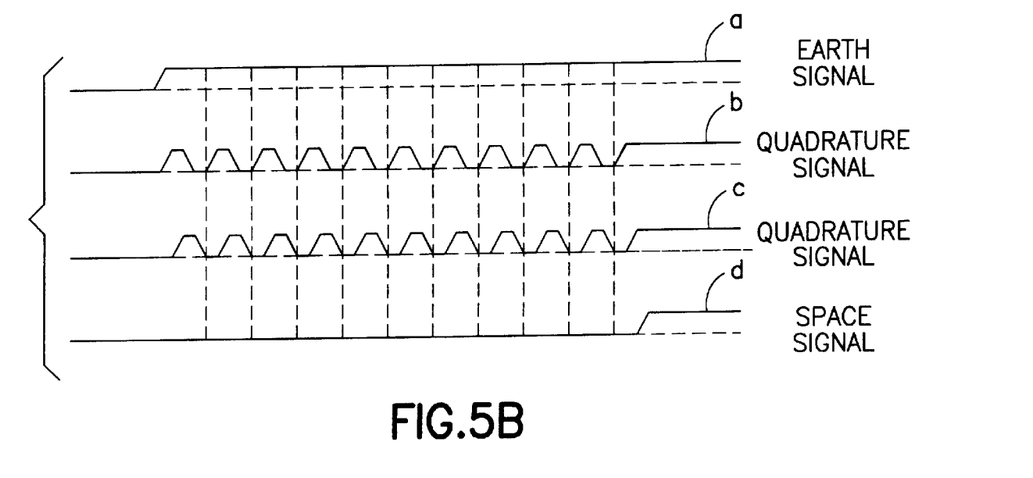
FIG. 5B illustrates the waveform of the output of the single array of FIG. 5A.

While many detector configurations can be contrived to generate the required signals and quadrature detection, an illustrative example is shown in FIG. 4A in which two arrays in quadrature, designated "A" and "B", as comprised of a number of elements connected as shown. Detectors A and B are identical with the same cyclic pattern which is shifted to the right in detector B. The "A" and "B" outputs as the horizon of the earth crosses these detectors is shown in FIG. 4B. The phase angle within a cycle is determined by the relative outputs "A" to "B". The "A" and "B" outputs can also be synthesized using a single array connected as shown in FIG. 5A. The waveforms of the four outputs, designated "a", "b", "c", and "d" are shown in FIG. 5B. The waveforms of the four outputs, designated "a", "b", "c", and "d" are shown in FIG. 5B and $$A = a - b - c;$$

$$B = b - c + d.$$

Figure 6:
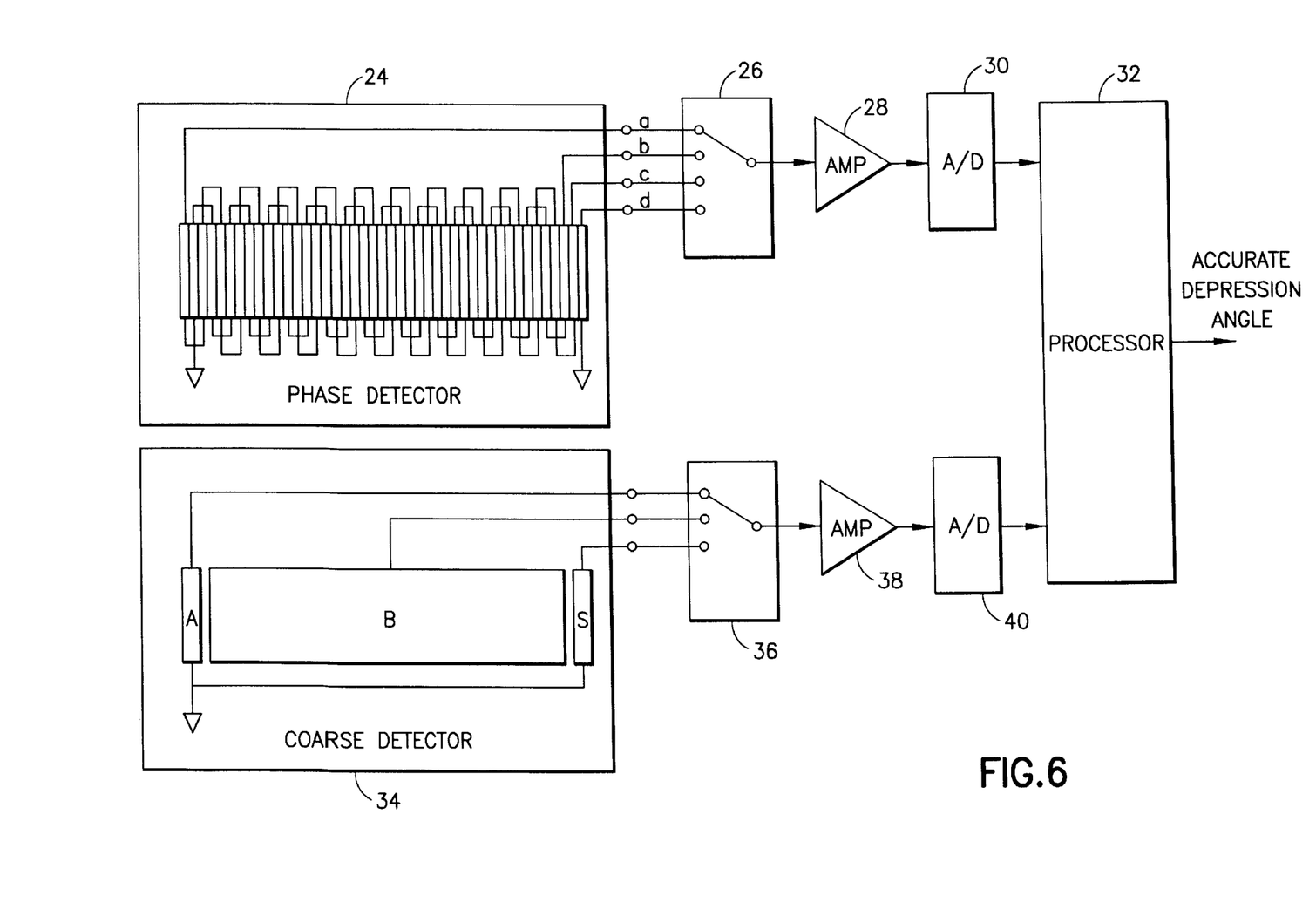
FIG. 6 is a simplified block diagram for determining an accurate depression angle using one quadrature detector and one coarse detector.
Figure 7:
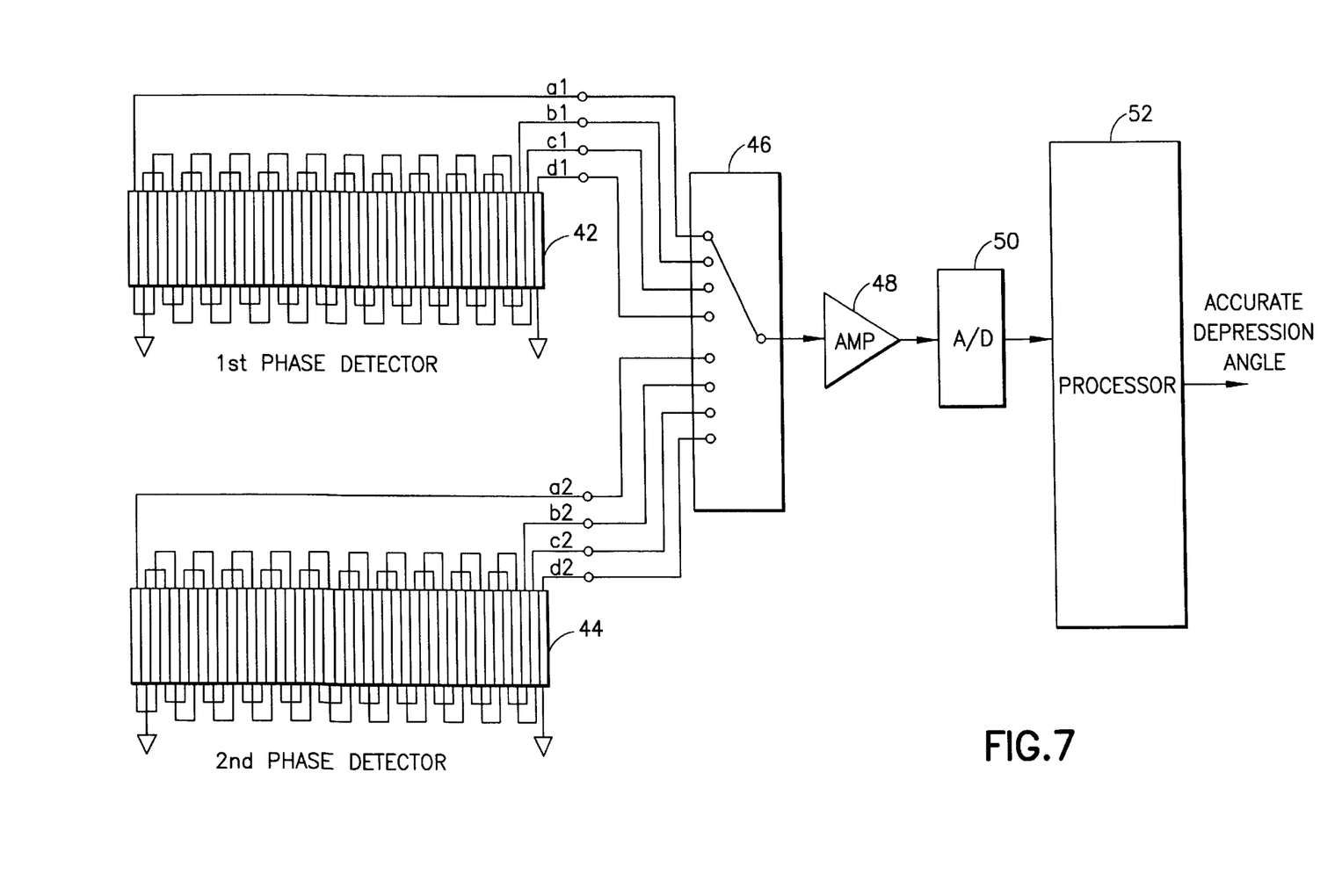
FIG. 7 is a simplified block diagram for a sensor using two quadrature (phase) detectors with different cycle lengths.

Two examples of illustrative embodiments are shown in FIGS. 6 and 7 although many different detector configurations and combinations may be employed to determine the satellite attitude.

FIG. 6 shows a simplified block diagram for determining an accurate depression angle using one quadrature phase detector 24 and one coarse detector 34. The coarse detector 34 could be in the same envelope as the quadrature detector or it could be in a separate co-aligned sensor. Phase detector 24 has its a, b, c, d outputs coupled to switching network 26 from which they are applied to amplifier 28 and fed to an A/D converter 30. Coarse detector 34 has its outputs, which include an earth reference A and a space reference S, applied to switching network 36, and then amplified by amplifier 38 and applied to A/D converter 40. Separate electronic channels are used for the two detectors although they could be combined. The outputs of the coarse and quadrature (phase) detector are fed to a single processor 32 which uses both of these outputs to generate an accurate depression angle.

The steps from the inputs to the generation of the accurate depression angle are:

1. Read a, b, c, d outputs from quadrature detector 24 and A2, B2, S2 outputs from coarse detector 34.
2. Combine a, b, c, and d into the two outputs A and B:

$$A = a - b - c;$$

$$B = b - c + d.$$

3. Calculate the phase angle from A and B using formula:

$$\text{Theta} = a\tan 2(A,B) \times H/360°;$$

where,
a tan 2 is the four-quadrant arctangent function with output in degrees;
H is the cycle length of the quadrature detector (in degrees).

4. Calculate the coarse depression angle, Xc, using formula:

$$Xc = H_A \times (B2 - K_B S2)/(A2 - K_A S2);$$

where,
$H_A$ is the height of the A field (in degrees);
$K_B$ and $K_A$ are calibration constants.

5. The accurate depression angle will then be given by:

$$X = nH + \text{Theta};$$

where n is an integer number ranging from 0 to one less than the number of cycles in the quadrature detector which minimizes the expression abs(X−Xc). ("abs" is the absolute value function.)

FIG. 7 shows a simplified block diagram for a sensor using two quadrature (or phase) detectors 42 and 44 with different cycle lengths, H1 and H2. The cycle lengths are chosen so that there is no repeat of combined phases within the overall length of the detector. For this figure, the 2nd detector 44 uses nine cycles to subtend the same angle as the first detector 42 does using ten cycles. The outputs of the detectors 42 and 44 are applied to switching network 46, amplifier 48, A/D converter 5 and processor 52.

The steps from the inputs to the generation of the accurate depression angle are:

6. Read a1 b1, c1, d1 outputs from the 1st quadrature detector 42 and a2, b2, c2, d2 outputs from the 2nd detector 44.

7. Combine into A1, B1, A2 and B2:

$A1=a1-b1-c1$, $B1=b1-c1+d1$;

$A2=a2-b2-c2$;

$B2=b2-c2+d2$.

8. Calculate the phase angles from A's and B's, for example, with formulas:

Theta $1=a$ tan $2(A1,B1) \times H1/360°$;

Theta $2=a$ tan $2(A2,B2) \times H2/360°$;

where, a tan 2 is the four-quadrant arctangent function with output in degrees;

H1 and H2 are the cycle lengths of the respective quadrature detectors (in degrees).

9. The accurate depression angle will then be given by:

$X=(X1+X2)/2$;

where $X1=nH1+\text{Theta1}$;

and $X2=mH2+\text{Theta2}$;

and where n is an integer number ranging from 0 to one less than the number of cycles in the 1st quadrature detector and m is a number ranging from 0 to one less than the number of cycles in the 2nd quadrature detector which minimizes the expression: abs (X1−X2). ("abs" is the absolute value function.)

Accordingly this new concept in horizon sensing utilizes small sized detectors interconnected in repetitive, cyclic patterns which are shifted in phrase to enable quadrature detection. The quadrature detection normalizes the non-uniformity of radiance on different parts of the earth's disc. The detectors can be interlaced, superimposed, radially or longitudinally displaced to view similar radiance levels. The large number of small detector elements allows many configurations and combinations which can be used and tailored to a specific application.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed:

1. A staring horizon sensor having at least one telescope means mounted in an orbiting satellite having infrared detector means on which the horizon to be detected is imaged thereon by said telescope means;

said infrared detector means comprising at least a first linear array of infrared detectors;

means for connecting said infrared detectors in repetitive cycles of alternating polarity periodic patterns for providing output signals from said linear array in which output signals are periodically offset in quadrature; and quadrature detector means coupled to said infrared detectors for determining the position of said horizon on said linear array of infrared detectors.

2. The staring horizon sensor as claimed in claim 1 having a second linear array of infrared detectors offset in phase from said first array whereby the outputs from said first and second linear arrays of infrared detectors are combined in said quadrature detector means to accurately determine the position of the horizon with respect to the periodic structure of the pair.

3. The staring horizon as claimed in claim 2 wherein said second linear array has a different cycle length than said first linear array so that there is no repeat of combined phases within the overall length of the detectors.

4. The staring sensor as claimed in claim 1 having a coarse detector means for determining the position of the horizon within a cycle of said first linear array which is combined with said first linear array to accurately determine the position of the horizon on said linear array.

5. The staring horizon sensor as claimed in claim 1 wherein the connecting of said infrared detectors in periodic patterns are in patterns which have a spatial frequency greater than the spatial frequency of thermal variations on the horizon being measured thereby providing focal plane data compression of said output signals and reducing the bandwidth and complexity required to produce said output signals.

6. A method of determining the attitude of a spacecraft using a staring array horizon sensor the steps of:

imaging the horizon on a first linear array of infrared detector means;

interconnecting the elements of the linear array infrared detector means in repetitive, cyclic alternating polarity patterns;

offsetting the phase of said repetitive patterns of infrared detector elements;

deriving signal outputs from said patterns of infrared detector elements; and quadrature detecting said signal outputs to determine the position of the spacecraft with respect to the horizon.

7. The method set forth in claim 6 including the steps:

offsetting said first linear array of infrared detectors with a similar second array of infrared detectors;

combining outputs from said first and second linear array; and quadrature detecting said combined output to determine the attitude of the spacecraft with respect to the horizon.

8. The method as claimed in claim 6 including the steps of:

coarse detecting the position of said spacecraft with said horizon and combining the results of said coarse detecting step with said quadrature detecting step to accurately determine the position of the spacecraft with respect to the earth.

9. The method of determining the attitude of a satellite orbiting the earth using a horizon sensor mounted on the satellite;

imaging the horizon on at least one linear array of infrared detector means, deriving a first repetitive signal from predetermined groups of interconnected, individual detector elements in said infrared detector means;

deriving a second repetitive signal from different predetermined groups of interconnected individual detector elements in said infrared detector means, shifted in phase from said first repetitive signal; and using said first and second repetitive signals in the determination of the position of the horizon with respect to said infrared detector means.

* * * * *